United States Patent
De Keyzer

(10) Patent No.: US 6,471,765 B2
(45) Date of Patent: Oct. 29, 2002

(54) DISPERSANT COMPOSITIONS IMPROVING THE HEAT STABILITY OF TRANSPARENT PIGMENTS

(75) Inventor: Gerardus De Keyzer, Riehen (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/916,898

(22) Filed: Jul. 27, 2001

(65) Prior Publication Data

US 2002/0016999 A1 Feb. 14, 2002

(30) Foreign Application Priority Data

Jul. 31, 2000 (EP) .............................. 00810688

(51) Int. Cl.$^7$ .......................... C09B 67/22; D06P 1/02; G02B 5/20

(52) U.S. Cl. .................. 106/494; 106/493; 106/495; 106/496; 106/497; 106/498; 430/7; 430/270.1; 524/90

(58) Field of Search ................. 106/493, 494, 106/495, 496, 497, 498; 430/7, 270.1; 524/90

(56) References Cited

U.S. PATENT DOCUMENTS

| | | | |
|---|---|---|---|
| 4,810,304 A | 3/1989 | Jaffe et al. | 106/494 |
| 5,194,088 A | 3/1993 | Bäbler et al. | 106/412 |
| 6,225,472 B1 | 5/2001 | Bäbler | 546/49 |
| 6,264,733 B1 | 7/2001 | Bäbler | 106/495 |

FOREIGN PATENT DOCUMENTS

| | | |
|---|---|---|
| GB | 2238550 A | 6/1991 |
| GB | 2238550 B | 4/1992 |
| JP | 6145546 | 5/1994 |
| JP | 06-145546 | 5/1994 |
| JP | 2000-160084 | 6/2000 |

Primary Examiner—Anthony J. Green
(74) Attorney, Agent, or Firm—David R. Crichton

(57) ABSTRACT

The present invention relates to compositions comprising a sulfonated diketopyrrolopyrrole and a Mannich-type substituted dihydroquinacridone to produce colored materials having improved stability at high temperatures. The instant compositions can be used for pigmenting polymeric materials, such as color filters.

27 Claims, No Drawings

DISPERSANT COMPOSITIONS IMPROVING THE HEAT STABILITY OF TRANSPARENT PIGMENTS

The present invention relates to compositions comprising a sulfonated diketopyrrolopyrrole and a Mannich-type substituted dihydroquinacridone. Such compositions are excellently suitable for dispersing fine-sized pigments (especially diketopyrrolopyrrole pigments) into polymers. They lead to pigmentations of increased stability at high temperatures.

Pigments of very fine particle size are difficult to disperse in polymers, and at high concentrations they lead to high viscosity and poor workability of the pigmented polymers. This is especially the case for diketopyrrolopyrrole pigments. There have been some attempts to solve this well-known problem by using additives, for example dispersants, rheology improvers and/or so-called synergists—whatever is meant therewith.

JP-A-06/145546 discloses phthalimidomethyl dihydroquinacridones and the use thereof as pigment dispersants. Some examples disclose their use for Pigment Red 254 or Pigment Violet 19, in further combination with ®BYK 160, which is a basic resin.

GB-B-2 238 550 discloses sulfonated diketopyrrolopyrrole mixtures and the use thereof as rheology improvers for diketopyrrolopyrrole pigments. Such a composition is commercially available for use in colour filters since 1997 as Irgaphore® Red BT-CF. Its use in liquid crystal displays is disclosed in JP-A-2000/160084.

However, the results obtained hitherto are still not entirely satisfactory. In particular, known pigment compositions undergo particle growth when incorporated into a polymer and heated to high temperatures. Thus, the transparency decreases and there are changes in hue, chroma and lightness. This is particularly problematic in the manufacture of colour filters.

Surprisingly, the instant compositions lead to a much improved heat stability. The optical and coloristic properties persist to a very satisfactory degree even when the pigmented material is heated to high temperatures. The instant compositions are also easier to make and to use with pigments, as the components can simply be mixed, without requiring special treatments.

The present invention relates to a composition comprising:

(a) a compound of formula

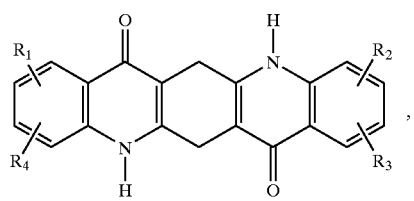

(I)

in which $R_1$ and $R_2$ are independently from each other H, F, Br, Cl, $C_1$–$C_3$alkyl and $C_1$–$C_3$alkoxy;

$R_3$ is a group $(SO_3^-M^+)_m$ wherein $M^+$ is H or a metal or ammonium cation and m is a number from zero to 2.5; and $R_4$ is a group

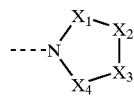

which can be unsubstituted or substituted by 1 to 3 groups halogen, oxy, hydroxy, $C_1$–$C_3$alkoxy, $SO_3^- M^+$ or $CO_2^- M^+$, wherein $X_1$ to $X_4$ are independently from each other CO, $NR_5$, O, S or $SO_2$, and/or $X_1$ and $X_2$ together, $X_2$ and $X_3$ together or $X_3$ and $X_4$ together are

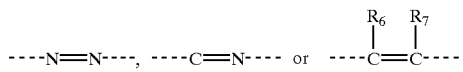

and $R_5$ to $R_7$ are independently from each other H, OH, $C_1$–$C_3$alkoxy or $C_1$–$C_3$alkyl or $R_6$ and $R_7$ together with —C=C— form an aromatic or heteroaromatic group; and (b) a sulfonated diketopyrrolopyrrole.

The nature of $M^+$ is not essential, as $M^+$ can easily be exchanged in the application. A metal M in formula (I) can for example be selected from IUPAC groups 1, 2, 3, 4 or 13. Preferably, M is sodium, potassium, calcium, magnesium or aluminum. When the metal forms cations with more than one positive charge, its stoichiometric amount should be calculated accordingly, for example 1/2 $Ca^{++}$ or 1/3 $Al^{+++}$ for 1 $M^+$.

$M^+$ as an ammonium cation in formula (I) is for example $NH_4^+$ or a primary, secondary, tertiary or quaternary ammonium salt, the substituents of which can be for example $C_1$–$C_{30}$alkyl, $C_5$–$C_6$cycloalkyl, $C_7$–$C_{30}$arylalkyl or $C_6$–$C_{18}$aryl, which can further be substituted by hydroxy or oxa groups, such as in polyalkylene oxy chains. Two substituents together can also for example form a ring, for example in pyrrole, pyridine, picoline, pyrazine, quinoline or isoquinoline. Preferably, the ammonium cation is $NH_4^+$ or $C_1$–$C_{30}$alkyl ammonium.

Examples of groups

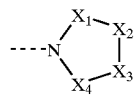

are pyrrolo, imidazolo, pyrazolo, indolo, isoindolo, indazolo, purino, carbazolo, perimidino, phenothiazino, phenoxazino or phthalimido. Aromatic or heteroaromatic groups

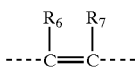

are for example phenylen, naphthylen, pyridylen, pyrazinylen, pyrimidinylen or pyridazinylen.

Most preferred group

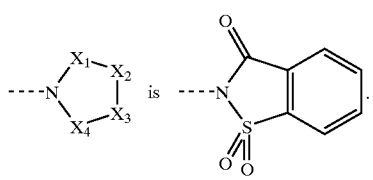

Preferably, m is 0 or 1, most preferably 0. Compounds of formula (I), can very conveniently be used also in the form of mixtures, wherein m is in average preferably from 0.0 to 0.5, most preferred from 0.0 to 0.1.

$R_1$ and $R_2$ are preferably both H and $R_4$ is preferably unsubstituted.

The compounds of formula (I) are known or can be prepared in close analogy to known methods, such as the method disclosed in EP-A-1 026 207.

The most preferred component (a) is of formula

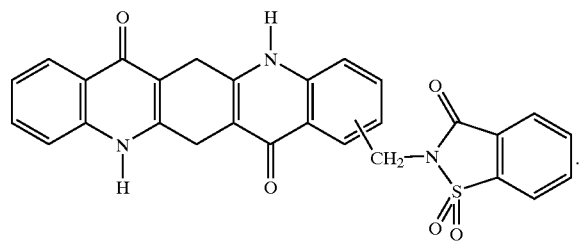

(II)

Sulfonated diketopyrrolopyrroles can for example be either pure compounds having 1 or 2 sulfonate groups or mixtures thereof, or preferably mixtures consisting of unsubstituted diketopyrrolopyrroles and sulfonated diketopyrrolopyrrole derivatives thereof having 1 or 2 sulfonate groups. Generally, such products or mixtures are easily obtained by sulfonating diketopyrrolopyrrole pigments as disclosed below. Depending on the conditions which are known per se, the pigment particles are entirely sulfonated and disappear, or only some particles are entirely sulfonated and disappear, or the particles are only sulfonated on their surface. The latter case is preferred, whereby the apparent number of sulfonate groups per molecule of pigment can also be less than 1.

In the absence of other substituents, sulfonation of diketopyrrolopyrroles generally leads to derivatives sulfonated in para position.

Preferred sulfonated diketopyrrolopyrrole (b) is a compound of formula

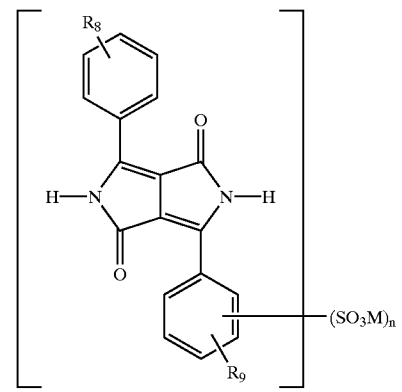

(III)

wherein $R_8$ and $R_9$ are each independently of the other hydrogen, halogen, cyano, carbamoyl, nitro, trifluoromethyl, phenyl, $C_1$–$C_6$alkyl, $C_1$–$C_6$alkoxy, $C_1$–$C_6$alkylthio or $C_1$–$C_6$alkylamino, $M^+$ is H or a metal or ammonium cation and n is a number from 0.1 to 2, more preferably from about 0.2 to about 1.0, most preferably about 0.6 to about 0.7.

Particularly preferred sulfonated diketopyrrolopyrroles (b) are such obtained from Colour Index Pigment Orange 71, Pigment Orange 73, Pigment Red 254, Pigment Red 255, Pigment Red 264, Pigment Red 272, 3,6-di(4'-cyano-phenyl)-2,5-dihydro-pyrrolo[3,4-c]pyrrol-1,4-dione, 3,6-di(3,4-dichloro-phenyl)-2,5-dihydro-pyrrolo[3,4-c]pyrrol-1,4-dione or 3-phenyl-6-(4'-tert.-butyl-phenyl)-2,5-dihydro-pyrrolo[3,4-c]pyrrol-1,4-dione. Suitable sulfonation methods are known in the art.

Most preferred are compounds of formula (III), wherein $R_8$ and $R_9$ are independently from each other H or Cl, and also mixtures thereof. $M^+$ is most preferably $Na^+$, 1/2 $Ca^{++}$ or $NH_4^+$.

The instant compositions preferably also comprises as an additional component (c) an organic pigment, preferably a polycyclic pigment, most preferably a diketopyrrolopyrrole pigment.

Preferably, component (c) is a pyrrolo[3,4-c]pyrrole of formula

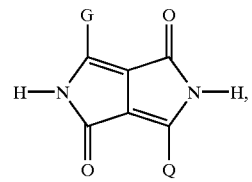

(IV)

wherein G and Q are each independently of the other a group of formula

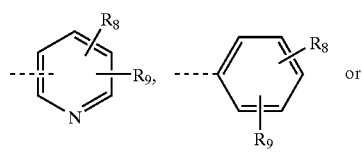

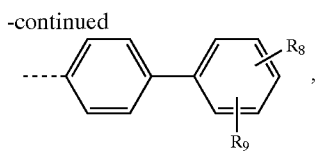

wherein $R_8$ and $R_9$ are each independently of the other hydrogen, halogen, cyano, carbamoyl, nitro, trifluoromethyl, phenyl, $C_1$–$C_6$alkyl, $C_1$–$C_6$alkoxy, $C_1$–$C_6$alkylthio or $C_1$–$C_6$alkylamino.

Particularly preferred components (c) are Colour Index Pigment Orange 71, Pigment Orange 73, Pigment Red 254, Pigment Red 255, Pigment Red 264, Pigment Red 272, 3,6-di(4'-cyano-phenyl)-2,5-dihydro-pyrrolo[3,4-c]pyrrol-1,4-dione, 3,6-di(3,4-dichloro-phenyl)-2,5-dihydro-pyrrolo[3,4-c]pyrrol-1,4-dione oder 3-phenyl-6-(4'-tert.-butyl-phenyl)-2,5-dihydro-pyrrolo[3,4-c]pyrrol-1,4-dione. Most preferred is Pigment Red 254.

The weight ratio of component (a) to component (b) is preferably from 5:95 to 95:5, more preferably from 20:80 to 80:20, most preferably from 40:60 to 60:40.

When the composition also comprises a component (c), the amount of components (a) and (b) together is preferably from 1 to 20% by weight, based on the weight of component (c).

Component (c) is preferably of small particle size. The mean particle size (by weight) is preferably from 0.005 to 0.2 μm, more preferably from 0.01 to 0.1 μm, most preferably from 0.03 to 0.06 μm.

The instant compositions can be obtained from the individual compounds by known methods such as dispersing in a liquid medium or very surprisingly and highly advantageously also simply by dry blending. They are much useful for pigmenting high molecular weight organic material in the mass. Alternatively, it is also surprisingly and highly advantageously possible to add the individual compounds separately to a high molecular weight organic material, or two individual compounds can be blended together (e.g. the sulfonated diketopyrrolopyrrole and the dihydroquinacridone derivative, or the pigment and the sulfonated diketopyrrolopyrrole) and added separately from the third one.

The high molecular mass organic material to be coloured in accordance with the invention may be natural or synthetic in origin and normally has a molecular weight in the range from $10^3$ to $10^8$ g/mol. The said material may, for example, comprise natural resins or drying oils, rubber or casein, or modified natural substances, such as chlorinated rubber, oil-modified alkyd resins, viscose, cellulose ethers or esters, such as cellulose acetate, cellulose propionate, cellulose acetobutyrate or nitrocellulose, but especially fully synthetic organic polymers (both thermosets and thermoplastics), as obtained by addition polymerization, polycondensation or polyaddition, examples being polyolefins such as polyethylene, polypropylene or polyisobutylene, substituted polyolefins such as polymers of vinyl chloride, vinyl acetate, styrene, acrylonitrile or acrylates and/or methacrylates or butadiene, and also copolymers of the abovementioned monomers, especially ABS or EVA.

From the series of the polyaddition resins and polycondensation resins, mention may be made of the condensates of formaldehyde with phenols, known as phenolic resins, and the condensates of formaldehyde with urea, thiourea and melamine, known as amino resins, the polyesters used as paint resins, and indeed both saturated resins, such as alkyd resins, and unsaturated resins, such as maleate resins, and also the linear polyesters and polyamides, or silicones.

The high molecular mass compounds mentioned may be present individually or in mixtures, as plastic masses or melts, which may if desired be spun into fibres.

They may also be present in the form of their monomers or in the polymerized state in dissolved form as film formers or binders for coating materials or printing inks, such as linseed oil varnish, nitrocellulose, alkyd resins, melamine resins, urea-formaldehyde resins or acrylic resins. When used in coatings together with the instant compositions, pigments exhibit higher fastnesses than the chemically identical pigments of similar mean particle size or of similar surface area. However, their use in coatings is relatively limited due to their high transparency (for example in metallic finishes).

Pigmentation of the high molecular mass organic substances with a pigment and the compositions of the invention takes place, for example, by mixing a pigment and an instant composition, premixed or separately, in the form if desired of masterbatches, into these substrates using roll mills, mixers or milling apparatus. In general, the pigmented material is subsequently brought into the desired ultimate form by techniques known per se such as calendering, compression moulding, extrusion, spreading, casting or injection moulding. In order to produce nonrigid mouldings or to reduce their brittleness it is often desirable to incorporate what are known as plasticizers into the high molecular mass compounds prior to their shaping. Examples of such plasticizers which may be used are esters of phosphoric acid, phthalic acid or sebacic acid. In the process of the invention, the plasticizers may be incorporated before or after the incorporation of the pigmentary colorant into the polymers. A further possibility, in order to obtain different hues, is to add fillers and/or other colouring constituents such as white, coloured or black pigments, and also effect pigments, in the particular desired amount to the high molecular mass organic materials in addition to the pigment compositions.

For pigmenting coating materials and printing inks, the high molecular mass organic materials, the pigments and the compositions of the invention, alone or together with additives such as fillers, other pigments, siccatives or plasticizers, are finely dispersed or dissolved in, generally, an organic and/or aqueous solvent or solvent mixture. One possible procedure here is to disperse or dissolve the individual components alone, or else two or more together, and only then to combine all of the components.

A further embodiment therefore additionally provides a mass-coloured high molecular mass organic material comprising
 (i) from 0.05 to 70% by weight, based on the sum of (i) and (ii), of (a), (b) and (c); and
 (ii) from 99.95 to 30% by weight, based on the sum of (i) and (ii), of a high molecular mass organic material.

Said material comprises both a ready-to-use composition or an article formed therefrom, and a masterbatch, in the form of granules, for example. If desired, the high molecular mass organic material coloured in accordance with the invention may also comprise customary additives, for example stabilizers.

A further embodiment therefore additionally provides a process for colouring high molecular mass organic material in the mass, which comprises incorporating therein a pigment composition of the invention or the individual components of said composition, for example by mixing the high molecular mass organic material with the pigment and the composition of the invention, optionally in the form of a masterbatch, in a manner known per se and processing this mixture.

The instant pigments compositions, however, are particularly preferably used for pigmenting high molecular weight organic materials which are processed at high temperatures, for example at 200 to 350° C. Most preferably, they are used for pigmenting high molecular weight organic materials which are processed at 260 to 320° C. It is at such high temperatures that the advantages of the instant compositions will be most apparent.

It is well-known in the field which high molecular weight organic materials amongst the above-mentioned are processed at the above-mentioned high temperatures. Most frequently, this is the case for engineering plastics such as for example polyolefins, polyamides or ABS, which may be processed by injection moulding; for fiber materials which may be processed by melt spinning; and for special coating materials such as those used for powder coatings or coil coatings.

The invention in particular also pertains to the use of the instant pigments in colour filters, which can themselves be used for example in electro-optical systems such as TV screens, liquid crystal displays, charge coupled devices, plasma displays or electroluminescent displays and the like. These may be, for example, active (twisted nematic) or passive (supertwisted nematic) ferroelectric displays or light-emitting diodes.

The pigments will generally be used in the manufacture of colour filters as a dispersion in an organic solvent or water. There are several ways to manufacture these colour filters, which follow two mainstreams:

Direct patterning during applying;

Patterning after applying the pigment.

Direct patterning can be obtained by several printing techniques, such as impact (off-set, flexography, stamping, letterpress etc.) as well as non-impact (ink jet techniques).

Other direct patterning techniques are based on lamination processes, electronic discharging processes like electrodeposition and some special colour proofing methods, like the so-called Chromalin™ process (DuPont).

For impact printing techniques, the pigment may be dispersed in water or organic solvents by standard de-agglomeration methods (Skandex, Dynomill, Dispermat and the like) in the presence of a dispersant and a polymeric binder to produce an ink. Any dispersion technique known in the field, including the choice of solvent, dispersant and binder, can be used. The type of ink and its viscosity depend on the application technique and are well-known to the skilled artisan. Most usual binders, to which the invention is of course not limited, are (meth)acrylates, epoxies, PVA, polyimids, Novolak systems and the like as well as combinations of these polymers.

The ink dispersion then can be printed on all kind of standard printing machines. Curing of the binder system is preferably achieved by a heating process. The three colours can be applied at once or in different printing steps with intermediate drying and/or curing steps, for example one colour at the time in three printing steps.

Inks for use in ink jet, for example piezo or bubble jet, can be prepared likewise. They generally contain a pigment dispersed in water and/or one or a mixture of many hydrophilic organic solvents in combination with a dispersant and a binder.

For ink jet printing a standard ink jet printer can be used or a dedicated printer can be built in order to optimize for example the printing speed etc.

For lamination techniques, like thermal transfer and the like, a web system has to be made: The pigment is dispersed in a solvent or water with dispersant and binder and coated on a foil and dried. The pigment/binder system can be patternwise or uniformly transferred to a colour filter substrate with the help of energy (UV, IR, heat, pressure etc.). Depending on the technique used, the colourant for example may be transferred alone (dye diffusion or sublimation transfer), or the colourant dispersion may be entirely transferred including the binder (wax transfer).

For electrodeposition, the pigment has to be dispersed in water together with an ionized polymer. By means of an electrical current, the ionized polymer is deionized at the anode or the cathode and, being insoluble then, deposited together with the pigments. This can be done on patterned or patternwise shielded, by a photoresist, (transparent) photoconductors like ITO etc.

The Chromalin™ process makes use of a photosensitive material, deposited on a colour filter substrate. The material becomes tacky upon UV exposure. The so called 'toner', comprising a mixture or compound of pigment and polymer, is distributed on the substrate and sticks on the tacky parts. This process has to be done three to four times for R,G,B and eventually black.

Patterning after applying is a method based mostly on the known photoresist technology, wherein the pigment is dispersed in the photoresist composition. Other methods are indirect patterning with the help of a separate photoresist or lamination techniques.

The pigment may be dispersed into photoresists by any standard method such as described above for the printing processes. The binder systems may also be identical. Further suitable compositions are described for example in EP 654711, WO 98/45756 or WO 98/45757.

Photoresists comprise a photoinitiator and a poly-crosslinkable monomer (negative radical polymerization), a material to crosslink the polymers itself (for example a photoacid generator or the like) or a material to chemically change the solubility of the polymer in certain developing media. This process, however, can also be done with heat (for example using thermal arrays or an NIR beam) instead of UV, in the case of some polymers which undergo chemical changes during heating processes, resulting in changes of solubility in the mentioned developing media. A photoinitiator is then not needed.

The photosensitive or heat sensible material is coated on a colour filter substrate, dried and UV(or heat) irradiated, sometimes again baked (photoacid generators) and developed with a developing medium (mostly a base). In this last step only the non-exposed (negative systems) or only the exposed (positive systems) parts are washed away, giving the wanted pattern. This operation has to be repeated for all the colours used.

Photosensitive lamination techniques are using the same principle, the only difference being the coating technique. A photosensitive system is applied as described above, however on a web instead of a colour filter substrate. The foil is placed on the colour filter substrate and the photosensitive layer is transferred with the help of heat and/or pressure.

Indirect processes, with the above mentioned polymeric binders without a photosensitive component, make use of an extra photoresist, coated on top of the pigmented resist. During the patterning of the photoresist, the pigmented resist is patterned as well. The photoresist has to be removed afterwards.

More details about the manufacture of colour filters can be found in text books, reviews and other scientific articles. The skilled artisan will associate the instant invention with the use of any such known technique as well.

For example, which is of course in no way limitative, substantially colourless methacrylic resin are commonly used in colour filters, examples thereof which are known to the skilled artisan being copolymers of aromatic methacrylates with methacrylic acid of $M_w$ from 30,000 to 60,000. Such resins are highly appropriated to make films by spin-coating. The colour filters of the invention contain the pigment compositions of the invention judiciously in a concentration of from 1 to 75% by weight, preferably from 5 to 50% by weight, with particular preference from 25 to 40% by weight, based on the overall weight of the pigmented layer.

The invention therefore likewise provides a colour filter comprising a transparent substrate and a layer comprising from 1 to 75% by weight, preferably from 5 to 50% by weight, with particular preference from 25 to 40% by weight, based on the overall weight of the layer, of a pigment composition of the invention or the individual components of said composition dispersed in a high molecular mass organic material. The substrate is preferably essentially colourless (T≧95% all over the visible range from 400 to 700 nm).

The instant printing inks or photoresists for making colour filters contain the pigment compositions of the invention judiciously in a concentration of from 0.01 to 40% by weight, preferably from 1 to 25% by weight, with particular preference from 5 to 10% by weight, based on the overall weight of the printing ink or photoresist.

The invention therefore likewise provides a composition for making colour filters comprising from 0.01 to 40% by weight, preferably from 1 to 25% by weight, with particular preference from 5 to 10% by weight, based on the overall weight of the composition, of a pigment composition of the invention dispersed therein.

This pigment composition also may additionally contain other colorants of different structure. The additional components will shift the mixture's spectrum hypsochromically or batho-chromically depending on their own hue. The skilled artisan will appreciate by himself which colorants can additionally be used, and in which amounts, depending on the desired colour.

In certain cases, it is advantageous to use the inventive compositions in mixture or in combination with other additives such as wetting agents, surfactants, defoamers, antioxidants, UV absorbers, light stabilizers, plastisizers, or general texture improving agents and so forth. Generally such additives can be used in a concentration from about 0.1 to 25 percent, preferably from about 0.2 to 15% and most preferably from about 0.5 to 8%, by weight based on the total weight of (a), (b) and (c).

Suitable surfactants include anionic surfactants such as alkylbenzene- or alkylnaphthalene-sulfonates, alkylsulfosuccinates or naphthalene formaldehyde sulfonates; cationic surfactants including, for example, quaternary salts such as benzyl tributyl ammonium chloride; or nonionic or amphoteric surfactants such as polyoxyethylene surfactants and alkyl- or amidopropyl betaines, respectively.

Suitable texture improving agents are, for example, fatty acids such as stearic acid or behenic acid, and fatty amines such as laurylamine and stearylamine. In addition, fatty alcohols or ethoxylated fatty alcohols, polyols such as aliphatic 1,2-diols or epoxidized soy bean oil, waxes, resin acids and resin acid salts may be used for this purpose.

Suitable UV stabilizers are, for example, the known benzotriazole derivatives known under the trade name TINUVIN® or CIBA® Fast H Liquid an aryl sulfonated benzotriazol, both being products of CIBA Specialty Chemicals Corporation.

The skilled artisan will obviously recognize that there are many other possible applications in all fields where organic pigments are used, such as inks, coatings and polymers. The instant compositions will prove particularly useful in combination with fine or transparent pigments, as soon as the application requires an elevated temperature. Where ever the thermal colour stability is an issue, it is worth to try resolving it by using the instant compositions, with a reasonable expectation of much better results to be obtained. Typical examples are coil- and powder coatings, extruded or injection moulded engineering plastics as well as melt-spun fibers, this list self-evidently not being exhaustive.

The following examples further describe some preferred embodiments of the invention, but do not limit the scope of the invention. In the examples, all parts are by weight unless otherwise indicated.

EXAMPLE 1A (see EP-A-1 026 207/example 20) A one liter flask equipped with a stirrer, thermometer, condenser and drying tube is charged with 200 ml concentrated (95–98%) sulfuric acid. 47.1 g 6,13-dihydroquinacridone are added at a temperature below 45° C. and the mixture is stirred for 10 minutes at 40 to 45° C., dissolving the 6,13-dihydroquinacridone completely. 23.2 g phthalimide are added at a temperature below 45° C. and the mixture is stirred for 10 minutes at 40 to 45° C. followed by the rapid addition of 4.9 g of para formaldehyde. The reaction mixture is stirred for one hour at 55–60° C., then poured into 2.5 liters of ice water. The precipitate is stirred for 2½ h at room temperature, then filtered. The press-cake is washed with water to a pH of 6 to 7 and dried yielding a phthalimidomethyl 6,13-dihydroquinacridone having a molecular weight of 473 (MALDI):

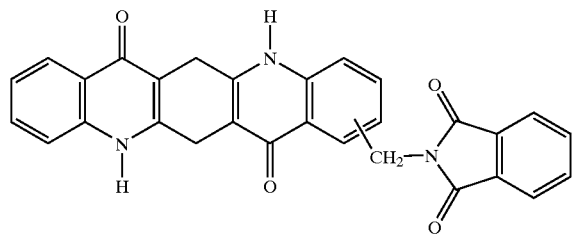

EXAMPLE 1B 2.5 g of 3,6-di(4'-chloro-phenyl)-2,5-dihydro-pyrrolo[3,4-c]pyrrol-1,4-dione (Pigment Red 254) of particle size 0.05 μm and having very few particles bigger than 0.1 μm are mixed by stirring in aqueous suspension with 0.14 g of the product of example 1A and 0.14 g of the diketopyrrolopyrrole sodium sulfonate according to example 1b) of GB-2 238 550. The mixture is then filtered, dried, milled and sieved.

EXAMPLE 1C 2.78 g of the composition of example 1B, 0.12 g of Solsperse® 22000 (Avecia), 0.58 g of Solsperse® 24000 (Avecia), 13.33 g of methoxy propyl acetate (RER 600™, Olin Corp.) and 78.33 g of zirconium oxide beads are dispersed in a bead mill for about 3 hours. 4.77 g of a 40% solution of an acrylate polymer in methoxy propyl acetate are added and dispersion is continued for half an hour. The dispersion is separated from the beads and diluted with 16.80 g of methoxy propyl acetate, then spin-coated on borosilicate glass plates (Corning 1737) at 1000 rpm. The coated glass plates are dried for 2 minutes at 100° C., then for 5 minutes at 200° C. on a hot plate to obtain a uniform red film of thickness 0.40.5 µm and excellent transparency and hue. The colour point measured in combination with standard light source C is x=0.493/y=0.295. Substantially, no sizeable crystals are observed under the optical microscope.

EXAMPLE 1D

Three plates according to example 1C are heated for 1 hour at 250° C., 260° C. and 270° C., respectively. Very few sizeable crystals are observed under the optical microscope.

EXAMPLE 1E

It is proceeded as in examples 1B, 1C and 1D, with the difference that dry blending is used instead of stirring in aqueous suspension. Similar results are obtained as in examples 1C and 1D. The colour point measured in combination with standard light source C is x=0.491/y=0.296.

EXAMPLE 2A (see EP-A-1 026 207/example 23) The procedure of Example 1 A is repeated using 27.6 g o-benzoic acid sulfimide sodium salt instead of phthalimide to yield a product in which o-benzoic acid sulfimide methyl 6,13-dihydro quinacridone having a molecular weight of 509 is detected by MALDI (formula (II)).

EXAMPLE 2B 2.5 g of 3,6-di(4'-chloro-phenyl)-2,5-dihydro-pyrrolo[3,4-c]pyrrol-1,4-dione (Pigment Red 254) of particle size 0.05 µm and having very few particles bigger than 0.1 µm are dry blended with 0.14 g of the product of example 1B and 0.14 g of the diketopyrrolopyrrole sodium sulfonate according to example 1b) of GB-2 238 550.

EXAMPLE 2C

The procedure of Example 1C is repeated but replacing the composition of example 1B by the composition of example 2B. Substantially, no sizeable crystals are observed under the optical microscope.

EXAMPLE 2D

The procedure of Example 1D is repeated but replacing the plates of example 1C by the plates of example 2C. Substantially, no sizeable crystals are observed under the optical microscope. The colour point measured in combination with standard light source C is x=0.493/y=0.296.

EXAMPLE 3A 9.00 g of a copper phthalocyanine pigment with ε crystal structure (Pigment Blue 15:6) is dispersed in 70 ml deionized water with 3 g of concentrated hydrochloric acid. 0.5 g of the product according to example 1A and 0.5 g of Solsperse® 5000 (sulfonated copper phthalocyanine, Avecia) are added and stirred for one hour. The mixture is then neutralized with diluted NaOH solution and filtered. The product is dried, milled and sieved.

EXAMPLE 3B 3.08 g of the composition of example 1B, 4.10 g of Disperbyk® 161 (30% solution, Byk Chemie), 14.62 g of methoxy propyl acetate (RER 600™, Olin Corp.) and 83.30 g of zirconium oxide beads are dispersed in a bead mill for about 3 hours. 4.01 g of a 40% solution of an acrylate polymer in methoxy propyl acetate are added and dispersion is continued for half an hour. The dispersion is separated from the beads and diluted with 25.8 g with methoxy propyl acetate, then spin-coated on borosilicate glass plates (Corning 1737) at 1000 rpm. The coated glass plates are dried for 2 minutes at 100° C., then for 5 minutes at 200° C. on a hot plate to obtain a uniform reddish blue film of thickness 0.35 µm and excellent transparency and hue. The colour point, measured with standard light source C, is x=0.155 /y=0.179.

EXAMPLE 4A 785.9 parts of Uvecoat® 2000 (acrylated polyester resin, UCB Chemicals, Drogenbos, Belgium), 12 parts of Resiflow® PV88 (acrylate copolymer, Worlee Chemicals GmbH, Lauenburg, Germany), 10 parts of Worlée-Add® 900 (diphenoxypropanol, Worlée Chemicals GmbH), 15 parts of Irgacure® 819 (bis(2,4,6-trimethylbenzoyl)-phenyl-phosphine oxide, Ciba Specialty Chemicals Inc., Basel, Switzerland), 15 parts of Irgacure® 2959 (1-[4-(2-hydroxyethoxy)-phenyl]-2-hydroxy-2-methyl-1-propan-1-one, Ciba Specialty Chemicals Inc.), 150 parts of Kronos® 2160 (rutile pigment, Kronos International GmbH, Leverkusen, Germany) and 12.12 parts of the product of example 1B are mixed together thoroughly using a large kitchen cutter. The composition is then extruded once only in a Prism 16 mm extruder fitted with a "super-ultra-high shear screw" at 80° C. barrel temperature and 300 rpm. The extrudates are rolled flat using a chill roll and hand crushed when cold with a rolling pin, then milled on a Retsch ZM-1™ ultracentrifugal mill at 15000 rpm using a 0.5 mm milling sieve to give a powder, which is passed through a 125 µm sieve to give the final UV-curable powder coating composition which is applied to phosphated, cold-rolled steel panels from Advanced Coating Technologies using a Wagner Tribo-Star gun at a thickness of 70 µm. The coated panels are heated under two carbon-filament IR lamps until a surface temperature of 140° C. is reached and then cured at a band speeds of 5 m/min using an Aetek™ exposure unit fitted with two medium pressure undoped mercury lamps both at 80 W/cm.

EXAMPLE 4B

The procedure of Example 1D is repeated but varying the temperature and the heating time by varying the distance of the carbon-filament IR lamps to the panels. The colour difference to the panels according to example 4A are negligible. The colour is surprisingly uniform even in the case of 3-dimensionally formed, complex panels such as car body sheets or parts.

EXAMPLE 4C

The procedure of Examples 4A and 4B is repeated but using 162.12 parts of the product of example 1B and no rutile pigment.

EXAMPLE 5A

The product according to example 1B is incorporated in a usual polyester/cellulose acetobutyrate paint at 7% by weight pigment level (based on solids in the paint composition). An excellently heat-stable coating is obtained.

EXAMPLE 5B

The product according to example 1B is incorporated in a usual polyester/cellulose acetobutyrate paint in white reduction, at a weight ratio of 10:90 with TiO$_2$ pigment (total pigment level=7% by weight of solids). An excellently heat-stable coating is obtained.

Comparative Example A

The procedure of Example 1A is repeated but using quinacridone poinstead of 6,13-dihydroquinacridone. The product is of structure

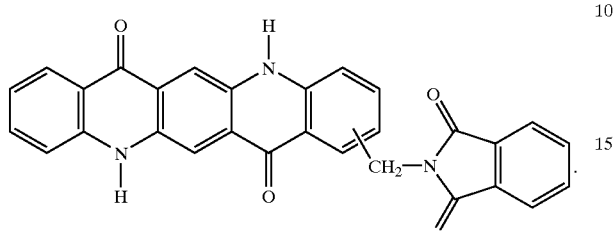

Comparative Example B

The procedure of Example 1B is repeated but replacing the product of example 1A by the product of comparative example A.

Comparative Example C

The procedure of Example 1C is repeated but replacing the composition of example 1B by the composition of comparative example B. Substantially, no sizeable crystals are observed under the optical microscope.

Comparative Example D

The procedure of Example 1D is repeated but using the plates of comparative example C instead of the plates of example 1C. On the plates heated to 260° C., big crystals are observed under the optical microscope. On the plates heated to 270° C., there is an increased quantity of big crystals.

Comparative Example E

Comparative examples B and C are repeated but using the dry blending procedure as in example 2B instead of stirring in aqueous suspension. The dispersion quality is visibly poor and agglomerates are observed under the optical microscope. These plates are not suitable for colour filters.

What is claimed is:

1. A composition comprising:
   (a) a compound of formula

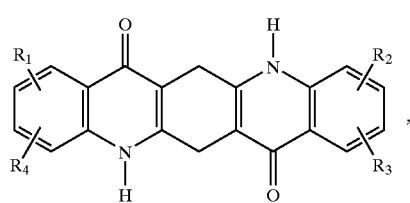

(I)

in which
   $R_1$ and $R_2$ are independently from each other H, F, Br, Cl, $C_1$–$C_3$alkyl and $C_1$–$C_3$alkoxy;
   $R_3$ is a group $(SO_3^-M^+)_m$ wherein $M^+$ is H or a metal or ammonium cation and m is a number from zero to 2.5; and $R_4$ is a group

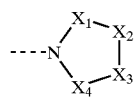

which can be unsubstituted or substituted by 1 to 3 groups halogen, oxy, hydroxy, $C_1$–$C_3$alkoxy, $SO_3^-M^+$ or $CO_2^-M^+$, wherein $X_1$ to $X_4$ are independently from each other CO, $NR_5$, O, S or $SO_2$, and/or $X_1$ and $X_2$ together, $X_2$ and $X_3$ together or $X_3$ and $X_4$ together are

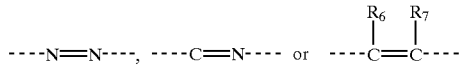

and $R_5$ to $R_7$ are independently from each other H, OH, $C_1$–$C_3$alkoxy or $C_1$–$C_3$alkyl or $R_6$ and $R_7$ together with —C=C— form an aromatic or heteroaromatic group; and (b) a sulfonated diketopyrrolopyrrole, wherein the ratio of (a) to (b) is from 5:95 to 95:5.

2. A composition of claim 1, wherein in formula (I) m is 0 or 1, $R_1$ and $R_2$ are both H and $R_4$ is unsubstituted.

3. A composition of claim 1, wherein (a) is of formula

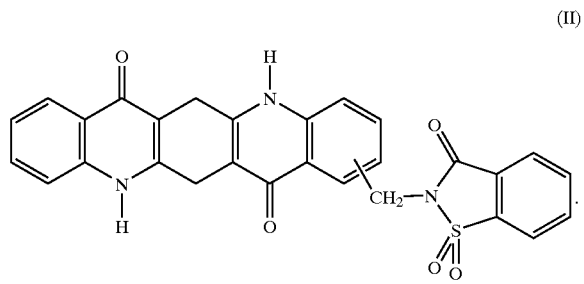

(II)

4. A composition of claim 1, wherein (b) is a compound of formula

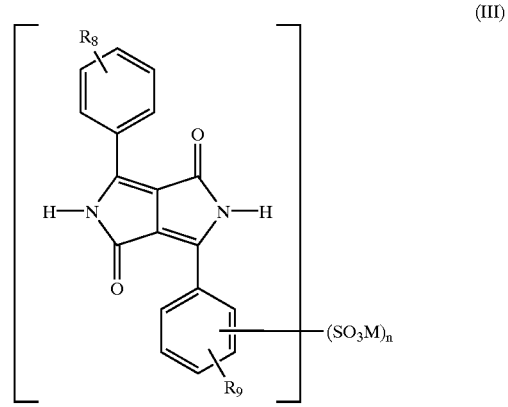

(III)

wherein $R_8$ and $R_9$ are each independently of the other hydrogen, halogen, cyano, carbamoyl, nitro, trifluoromethyl, phenyl, $C_1$–$C_6$alkyl, $C_1$–$C_6$alkoxy, $C_1$–$C_6$alkylthio or $C_1$–$C_6$alkylamino, $M^+$ is H or a metal or ammonium cation and n is a number from 0.1 to 2.

5. A composition of claim 4, wherein n is a number from about 0.2 to about 1.

6. A composition of claim 4, wherein n is a number from about 0.6 to about 0.7.

7. A composition of claim 1, wherein the weight ratio of component (a) to component (b) is from 20:80 to 80:20.

8. A composition of claim 1, wherein the weight ratio of component (a) to component (b) is from 40:60 to 60:40.

9. A composition of claim 1, which further comprises (c) a polycyclic pigment.

10. A composition of claim 1, which further comprises (c) a diketopyrrolopyrrole pigment.

11. A composition of claim 1, which further comprises (c) a polycyclic pigment,
wherein the weight ratio of component to component (b) is from 20:80 to 80:20,
wherein (b) is a compound of formula

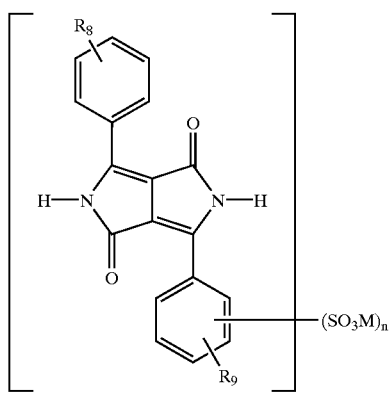

(III)

wherein $R_8$ and $R_9$ are each independently of the other hydrogen, halogen, cyano, carbamoyl, nitro, trifluoromethyl, phenyl, $C_1$–$C_6$alkyl, $C_1$–$C_6$alkoxy, $C_1$–$C_6$alkylthio or $C_1$–$C_6$alkylamino, $M^+$ is H or a metal or ammonium cation and n is a number from about 0.2 to about 1.0, and
wherein the mean particle size of component (c) is from 0.01 to 0.1 μm.

12. A composition of claim 1, which further comprises (c) a diketopyrrolopyrrole pigment,
wherein the weight ratio of component (a) to component (b) is from 40:60 to 60:40,
wherein(b) is a compound of formula

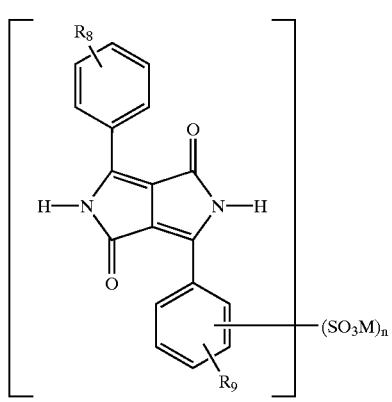

(III)

wherein $R_8$ and $R_9$ are each independently of the other hydrogen, halogen, cyano, carbamoyl, nitro, trifluoromethyl, phenyl, $C_1$–$C_6$alkyl, $C_1$–$C_6$alkoxy, $C_1$–$C_6$alkylthio or $C_1$–$C_6$alkylamino, $M^+$ is H or a metal or ammonium cation and n is a number from about 0.6 to about 0.7, and
wherein the mean particle size of component (c) is from 0.03 to 0.06 μm.

13. A composition of claim 1, wherein in formula (I) m is 0, $R_1$ and $R_2$ are both H and $R_4$ is unsubstituted.

14. A composition of claim 1, which further comprises (c) an organic pigment.

15. A composition of claim 14, wherein the mean particle size of component (c) is from 0.005 to 0.2 μm.

16. A composition of claim 14, wherein component (c) is a pyrrolo[3,4-c]pyrrole of formula

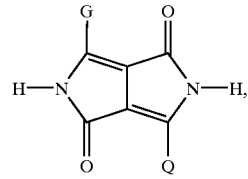

(IV)

wherein G and Q are each independently of the other a group of formula

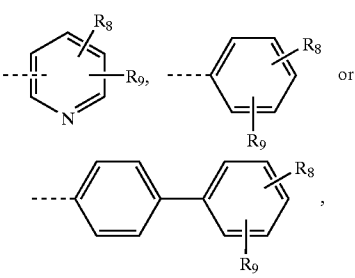

wherein $R_8$ and $R_9$ are each independently of the other hydrogen, halogen, cyano, carbamoyl, nitro, trifluoromethyl, phenyl, $C_1$–$C_6$alkyl, $C_1$–$C_6$alkoxy, $C_1$–$C_6$alkylthio or $C_1$–$C_6$alkylamino.

17. A composition of claim 14, wherein the mean particle size of component (c) is from 0.01 to 0.1 μm.

18. A composition of claim 14, wherein the mean particle size of component (c) is from 0.03 to 0.06 μm.

19. A mass-coloured high molecular mass organic material comprising
(i) from 0.05 to 70% by weight, based on the sum of (i) and (ii), of (a), (b) and (c) according to claim 14; and
(ii) from 99.95 to 30% by weight, based on the sum of (i) and (ii), of a high molecular mass organic material.

20. A material of claim 19, which is a fiber or a coating.

21. A process for colouring high molecular mass organic material in the mass, which comprises incorporating therein a composition according to claim 14.

22. A colour filter comprising a transparent substrate and a layer comprising from 1 to 75% by weight, based on the overall weight of the layer, of a composition according to claim 14 dispersed in a high molecular mass organic material.

23. A color filter comprising a transparent substrate and a layer comprising from 5 to 50% by weight, based on the overall weight of the layer, of a composition according to claim 14 dispersed in a high molecular mass organic material.

24. A colour filter comprising a transparent substrate and a layer comprising from 25 to 40% by weight, based on the overall weight of the layer, of a composition according to claim 14 dispersed in a high molecular mass organic material.

25. A colour filter comprising a transparent substrate and a layer comprising from 1 to 75% by weight, based on the overall weight of the layer, of a composition according to claim 11 dispersed in a high molecular mass organic material.

26. A colour filter comprising a transparent substrate and a layer comprising from 1 to 75% by weight, based on the overall weight of the layer, of a composition according to claim 12 dispersed in a high molecular mass organic material.

27. A process for colouring high molecular mass organic material in the mass, which comprises incorporating therein (a) a compound of formula

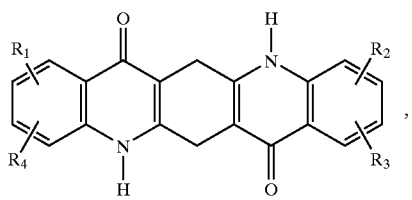

(I)

in which $R_1$ and $R_2$ are independently from each other H, F, Br, Cl, $C_1$–$C_3$alkyl and $C_1$–$C_3$alkoxy;

$R_3$ is a group $(SO_3^- M^+)_m$ wherein $M^+$ is H or a metal or ammonium cation and m is a number from zero to 2.5; and $R_4$ is a group

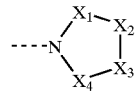

which can be unsubstituted or substituted by 1 to 3 groups halogen, oxy, hydroxy, $C_1$–$C_3$alkoxy, $SO_3^- M^+$ or $CO_2^- M^+$, wherein $X_1$ to $X_4$ are independently from each other CO, $NR_5$, O, S or $SO_2$, and/or $X_1$ and $X_2$ together, $X_2$ and $X_3$ together or $X_3$ and $X_4$ together are

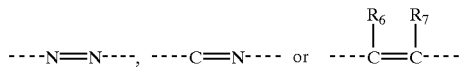

and $R_5$, to $R_7$ are independently from each other H, OH, $C_1$–$C_3$alkoxy or $C_1$–$C_3$alkyl or $R_6$ and $R_7$ together with —C=C— form an aromatic or heteroaromatic group;

(b) a sulfonated diketopyrrolopyrrole; and (c) an organic pigment, wherein the ratio of (a) to (b) is from 5:95 to 95:5 and the amount of components (a) and (b) together is from 1 to 20% by weight, based on the weight of component (c).

* * * * *